United States Patent [19]

Schneider

[11] Patent Number: 4,480,589
[45] Date of Patent: Nov. 6, 1984

[54] SAFETY COLLAR DEVICE

[76] Inventor: Mitchell Schneider, 12050 Dodd Rd., Rosemount, Minn. 55068

[21] Appl. No.: 488,988

[22] Filed: Apr. 27, 1983

[51] Int. Cl.³ .............................................. A01K 27/00
[52] U.S. Cl. ...................................... 119/106; 24/327; 24/115 R
[58] Field of Search ............. 119/106, 156; 24/116 A, 24/299, 115 F, 115 R, 327

[56] References Cited

U.S. PATENT DOCUMENTS 1,578,940  1/1926  Wacha ............................. 24/116 A
3,701,339 10/1972  Kemmerling ..................... 119/106
4,233,714 11/1980  Panicci ............................. 24/116 A

FOREIGN PATENT DOCUMENTS 14217  9/1933  Australia ............................ 119/106

Primary Examiner—Gene Mancene
Assistant Examiner—Kris R. Schulze
Attorney, Agent, or Firm—Kinney & Lange

[57] ABSTRACT

A safety collar device prevents choking of an animal when the animal catches the collar on a stationary object while running loose. The device includes a safety enclosure which envelopes the connecting mechanism of the collar (such as the "live" and "dead" rings at the ends of the chain of a choke collar) thus preventing the rings from being caught on the stationary object. The enclosure includes first and second enclosure halves which preferably are hinged to each other and operable between an open and a closed position. When in the closed position, the first and second halves completely conceal the rings of the choke collar. The enclosure has openings for the chain of the collar to pass through but which are sufficiently small to retain the rings within the enclosure. The safety enclosure includes a mechanism for keeping the first and second halves in the closed position.

8 Claims, 4 Drawing Figures

SAFETY COLLAR DEVICE

BACKGROUND OF THE INVENTION

1. Field of the Invention.

The present invention relates to an animal safety collar of the type that prevents the animal from being caught or being chocked when the collar catches on an object while the animal is running loose.

2. Description of the Prior Art.

Dogs and other such animals typically wear collars around their necks. Many dogs wear a choker-type collar which is used as a training device for dogs and/or a restraining device for larger dogs.

The choker-type collar typically includes a chain of links with a "live" and a "dead" ring located at opposite ends of the chain. The chain is typically pulled through the "dead" ring to form a chain loop that is placed around the dog's neck. The end of the chain with the "live" ring can be pulled through the "dead" ring thereby choking the dog permitting the owner to control the dog. Although the choker-type collar is a popular training aid, many dogs have been choked to death when running loose while wearing the choke collar. The "live" ring or the end of the chain attached to the "live" ring has been known to get caught on a stationary object while the dog is running, thereby choking the dog.

In addition, other collars, not of the choke collar variety, are also susceptible to catching on such stationary objects. Although, with these types of collars, the dog is not in danger of being choked, the dog is immobilized and will need assistance in order to get free.

Several patents in the prior art illustrate various attempts in trying to provide a safety collar.

The Elsinger U.S. Pat. No. 2,616,394 shows a choke collar used for training dogs. The choke collar has a pair of connecting ring assemblies which force the individual links of the collar to lie flat relative to the neck of the dog regardless of the suddenness with which pressure is exerted on the choke collar. Consequently, the individual links of the chain do not bit into the dog's neck, eliminating injury to the dog which existed in previous choke collars. However, the choke collar of the Elsinger Patent does not obviate the injury that can be caused to a dog when running loose and catching the "live" ring on a stationary object, choking the dog.

The Sullivan U.S. Pat. No. 2,743,702 shows a choke collar that can be used as a choke collar or can be converted to a standard collar all without removing or passing the collar over the animal's head. However, the collar of the Sullivan Patent does not solve the problem of the choke collar catching on a stationary object when in the choke mode.

The kemmerling U.S. Pat. No. 3,701,339 illustrates a sleeve element that has an opening at each end of the sleeve and through which the chain of the collar passes. The sleeve is larger at one end than the circumference of the "live" ring of the choke collar and is slid over the ring covering the ring. The sleeve element of the Kemmerling Patent covers only a single link of chain, the "live" ring, and does not take the choke collar out of a choking mode. Consequently, the dog can still be choked if another link of the collar is caught on a stationary object since the chain would still be passing through the "dead" ring of the collar. In addition, the sleeve element can get caught on a stationary object.

The Bongiovanni U.S. Pat. No. 3,817,218 illustrates an improved dog choke collar wherein the chain is covered by a tube of tough plastic or plastic-like material to avoid contact by the chain with the dog's neck. Although the choke collar of the Bongiovanni Patent eliminates the damage to hair and skin on the neck of the dog, the choke collar does not solve the problem of the collar becoming caught and choking the dog.

The Herbert U.S. Pat. No. 3,872,833 shows a collar adapted to be used either as a standard collar or as a choke collar. A fastener is attached to the "live" ring and when the collar is in a conventional mode, the fastener is attached to one of the links of the collar and the leash is attached to the "dead" ring. To place the collar in a choke collar mode, the fastener is disengaged from the link of the chain and the leash is attached to the "live" ring. Again, the Herbert Patent does not solve the problem of the "live" ring catching on a stationary object when the collar is in the choke mode. In addition, this type of collar is not permitted in American Kennel Club sponsored functions and consequently must be removed and a standard collar placed on the dog.

The Gardner et al U.S. Pat. No. 3,995,598 shows another variation of a safety collar. The Gardner collar uses a breakaway element connected between a first "live" ring which is directly connected to one end of the choke-chain and a second "live" ring to which the leash is attached. When the choking force exceeds a predetermined threshhold value, the breakaway element between the first and second "live" rings snaps. However, the first "live" ring can still be caught on a stationary object when the dog is running loose, choking the dog.

A Swiss Patent granted to Gottfried Knüsel, No. 314,228, shows a collar that has a stop ring on a side of the "dead" ring opposite from the "live" ring. The collar of the Gottfried Knüsel Patent does not solve the safety problem of conventional choke collars but merely illustrates a type of choke collar that limits the amount a dog can be choked.

SUMMARY OF THE INVENTION

The present invention includes a neck collar having first and second connecting members connectable with each other to form a continuous collar loop and a safety enclosure enveloping the first and second connecting members. The enclosure includes first and second enclosure halves preferably hingedly attached to each other and operable between an open and a closed position. A latching mechanism retains the first and second halves in a closed position up to a predetermined threshhold value. The enclosure, when in the closed position, includes at least one opening through which the collar extends so that the connecting members are positionable within the enclosure. The openings are sufficiently small so that the first and second connecting members cannot slide out of the safety enclosure.

When the neck collar is a choke-type collar, the "live" and "dead" rings of the choke collar are placed within the enclosure to prevent the "live" ring from getting caught while the dog is running loose. Alternatively, the choke-type collar is placed in a non-choking mode, with the rings disengaged from each other, and the disengaged rings are placed in the enclosure. The enclosure then serves as a link between the "live" and "dead" rings. If the collar gets caught on a stationary object, the dog will pull on the collar until the predetermined threshold value of the latching mechanism is overcome, at which time the enclosure opens and permits the dog to free itself.

DETAILED DESCRIPTION OF THE PREFERRED EMBODIMENTS

Figure 1:
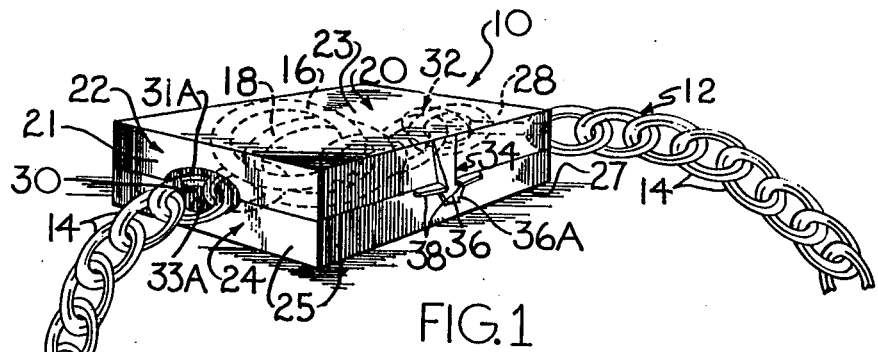
FIG. 1 is a perspective view of the safety collar device of the present invention.

The safety collar device of the present invention is generally indicated at 10 in FIG. 1. Preferably, the safety collar device includes a choke collar 12. Although a choke collar is preferred, a standard collar is includable within the present invention when the invention is placed in a "release" state. The collar 12 has a plurality of interlocked links 14 forming a chain with a "live" ring 16 at one end and a "dead" ring 18 at another end. The "live" and "dead" rings 16 and 18 are larger in size than the individual chain links 14. The "live" ring 16 is at least as large in diameter as the "dead" ring 18.

Figure 2:
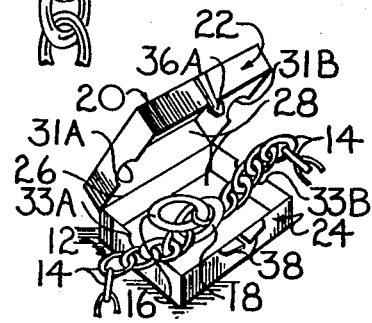
FIG. 2 is a perspective view of the safety enclosure in an open position illustrating the rings of a choke collar in a choking mode positioned therein.

A safety enclosure 20 completely envelopes the "live" ring 16 and the "dead" ring 18. The safety enclosure includes an upper enclosure half 22 and a lower enclosure half 24. Preferably, the upper half 22 and the lower half 24 are hingedly attached to each other by a living hinge 26, as illustrated in FIG. 2. In one successful embodiment, the upper half 22 and the lower half 24 and the living hinge 26 are molded as one integral piece from polypropylene or other plastic material with similar properties. The living hinge 26 permits the upper half 22 and the lower half 24 to be operable to an open position, as illustrated in FIG. 2, and to a closed position, as illustrated in FIG. 1.

The upper and lower halves 22 and 24 are preferably mirror images of each other. The upper half 22 has side walls 21 and a top 23 and the lower half has side walls 25 and a bottom wall 27. Although the enclosure is shown rectangular in shape, other enclosure shapes, such as hexagonal, oval or circular, are within the scope of the present invention. Further, other forms of an enclosure such as upper and lower halves being hemispherical in configuration are also includable within the present invention, with the criterion that the upper and lower enclosure halves are operable between an open and a closed position.

When in the closed position, the upper half 22 and the lower half 24 are placed in abutting relationship to form a cavity 28. The cavity 28 is sufficiently large to completely envelope and house the "live" ring 16 and the "dead" ring 18. A pair of openings 30 and 32 are formed by the upper half 22 and the lower half 24 when in the closed position. The upper half of the opening 30 is formed by a curved edge 31A of the upper enclosure half 22 and a curved edge 33A of the lower enclosure half 24. The opening 32 is similarly formed with similar curved edges 31B and 33B in the upper and lower enclosures halves on an opposite side wall. As illustrated in FIG. 2, the rings 16 and 18 are placed within the lower enclosure half with the links of the chain positioned over the lower curved edges of the lower enclosure half 24. The upper and lower halves are then placed in the closed position, concealing and retaining the rings 16 and 18 within the cavity 28.

The upper half 22 and the lower half 24 are held in a closed position by a clasp 34. The clasp 34 preferably includes a tongue member 36 attached to the upper half 22 and two spaced apart retaining tabs 38 attached to the lower half 24. Preferably, the tongue 36 and the tabs 38 are integrally molded with the upper and lower halves, respectively. The tongue 36 extends below a lower edge of the upper enclosure half 22 and has a head 36A which extends between the tabs 38 engaging an underside of each tab 38 thereby holding the upper and lower halves in a closed position. The clasp 34 releases the upper and lower halves 22 and 24 from the closed position at a predetermined threshhold value. A suitable threshold value is in the range of approximately 20 to 30 pounds of force. Although the clasp 34 is described in detail, it should be understood that clasps of other structure and other retaining mechanisms are within the scope of the present invention.

Figure 3:
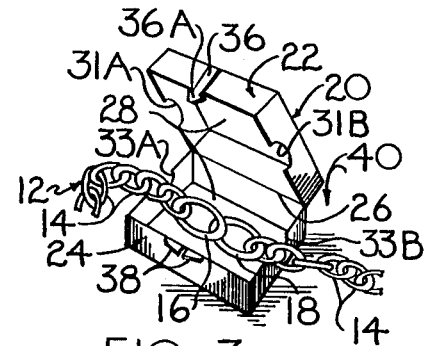
FIG. 3 is a perspective view of the safety enclosure in an open position illustrating the rings of the choke collar in a disengaged mode.
Figure 4:
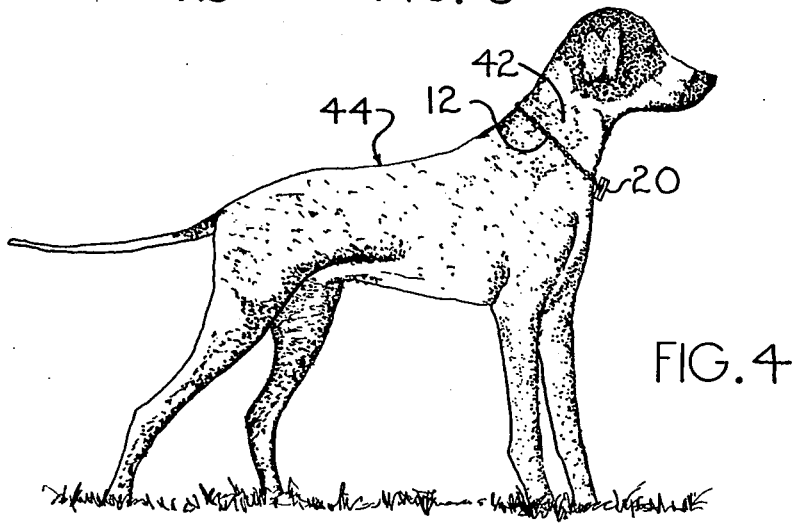
FIG. 4 is a perspective view of the safety collar device of the present invention on a dog.

To place the present invention in a "release" state, the "live" and "dead" rings 16 and 18 are positioned within the lower enclosure half in the disengaged relationship, as illustrated in FIG. 3. The links of the chain are then positioned over the curved edges of the lower enclosure half 24. The upper enclosure half 22 is then pivoted along the living hinge 26 in a downwardly direction as indicated by arrow 40 to a closed position. When in the closed position, the enclosure serves as a link between the "live" and "dead" rings of the collar 12. When in a closed position, the collar 12 and the enclosure 20 are suitably positioned over the neck 42 of a dog 44, as illustrated in FIG. 4.

When the dog 44 is running free with the collar device of the present invention and if the collar device should happen to get caught on a stationary object, the dog will pull to set itself free. With the present invention, the dog simply has to exert enough force to overcome the threshhold value of the clasp 34 of the enclosure 20. When the dog exerts force greater than the threshhold value of the clasp 34, the upper and lower halves 22 and 24 will retract to an open position, releasing the "live" and "dead" rings 16 and 18 from with the cavity 28, freeing the dog. As will be easily understood by those skilled in the art, in the release state, the present invention includes other types of collars other than choke collars that are connected at their ends to form the collar. The ends of the collars other than choke collars are placed similarly within the enclosure with the connecting ends in a disconnected relationship.

To place the present invention in a non-choking mode, the "live" and "dead" rings of the choke collar are placed within the lower enclosure half 24 in a choking mode, as illustrated in FIG. 2. The links 14 of the chain are placed over the lower curved edges of the lower enclosure half. The upper and lower enclosure halves are then pivoted about the living hinge 26 to a closed position. When in the closed position, the "live" and "dead" rings 16 and 18 are concealed from view eliminating the possibility of the "live" ring 16 getting caught on a stationary object while the dog is running loose. To use the collar 12 in a choking mode, the upper and lower enclosure halves 22 and 24 are simply retracted to an open position and the dog owner then uses the collar 12 in a conventional manner.

The device of the present invention also serves as an identification tag. The inner surfaces of the upper and lower halves are preferably a vapor finish permitting the owner to write identification information on the inner surface.

In summary, the safety collar device of the present invention provides an owner with a simple means of preventing his dog from being choked while running loose with a choke collar. In addition, the present invention permits a more concerned owner to place a collar in a "release" state such that if the dog catches his collar while running loose, the dog, through its own effrots of trying to get loose, will release itself.

Although the present invention has been described with reference to preferred embodiments, workers skilled in the art will recognize that changes may be made in form and detail without departing from the spirit and scope of the invention.

What is claimed is:

1. A safety collar for an animal, the collar comprising:
   a neck collar including a strand and first and second connecting means at each end of the strand connectable with each other to form a continuous collar loop; and
   a safety enclosure enveloping the first and second connecting means, the enclosure comprising first and second enclosure halves operable between an open and a closed position, means for positioning the first and second halves between the open and closed positions, and a clasp mechanism for retaining the first and second halves in a closed position, the first and second halves when in a closed position defining a cavity therebetween which is sufficiently large to conceal the first and second connecting means with at least one opening communicating with the cavity, the strand of the neck collar extending through the opening and wherein the opening is sufficiently small to prevent the first and second connecting means from exiting the cavity through the opening, the clasp mechanism having a predetermined force value for holding the first and second halves in a closed position that is less than the force an animal exerts in struggling for freedom when the collar is caught on a stationary object so that when the first and second connecting means are in a disengaged position within the cavity of the enclosure formed by the first and second halves the clasp mechanism releases the first and second halves when the animal exceeds the predetermined force value.

2. The collar of claim 1 wherein the first connecting means includes a dead ring and the second connecting means includes a live ring, the live ring having a diameter at least as large as the diameter of the dead ring.

3. The collar of claim 1 wherein the means for positioning the first and second halves between a closed and open position is a hinge pivotally attaching the first and second halves with each other.

4. The collar of claim 3 wherein the first and second halves and the hinge are an integral unit.

5. The collar of claim 1 wherein the first and second halves and the hinge are molded from a plastic material.

6. The collar of claim 1 wherein the first and second connecting means are a live and a dead ring of a choke collar connected in a choke mode within the cavity of the enclosure and concealed by the enclosure from stationary objects while the animal is running loose.

7. The collar of claim 1 wherein the first half has an inner indicia surface for placement of indicia thereon.

8. A method of placing a choke-type collar having a live and dead ring connected by a chain around the neck of an animal preventing the live ring of the collar from becoming caught on a stationary object while the animal is running loose, the method comprising:
   positioning the collar around the animal's neck with the live and dead rings connected in a choke mode;
   placing an enclosure having first and second pivotally connected enclosure halves defining a cavity around the live and dead rings;
   positioning a portion of the chain of the choke collar within openings of the enclosure; and
   concealing the live and dead rings by closing the enclosure.

* * * * *